Patented Aug. 12, 1941

2,252,500

UNITED STATES PATENT OFFICE 2,252,500

METHOD OF PREPARING FLUORESCENT MATERIALS

Gorton R. Fonda, Schenectady, N. Y., assignor to General Electric Company, a corporation of New York No Drawing. Application December 7, 1939, Serial No. 308,009

9 Claims. (Cl. 250—81)

The present invention relates to luminescent materials characterized by phosphorescence and fluorescence (herein termed a phosphor), or only improved fluorescence as the case may be, and consists in an improved method of preparing such materials. This application is a continuation-in-part of my application Serial No. 118,323, filed December 30, 1936.

As a consequence of my invention luminescent materials may be prepared which not only are efficient as light emitters by fluorescence (that is, giving out light of a wave length differing from the wave length of radiations impinging on the material), but which also exhibit marked phosphorescence (that is, giving out light during an appreciable interval after the exciting radiation has ceased). One of the characteristics of my improved materials is greater retention of fineness of the particles during heat treatment, so that the fired product may be used without the depreciating effect which extensive regrinding has on a fluorescent powder.

In one of its aspects my invention is characterized by improvement in the facility of preparation and decrease of time required for the preparation of luminescent materials.

It has been suggested heretofore to prepare fluorescent material by mixing the powdered ingredients and subjecting the mixture to thermosynthesis, that is, to reaction produced by firing at high temperature, but the resulting product is apt to be so coarse-grained as to require regrinding. The effectiveness of the product for fluorescent purposes is reduced by grinding after the final firing step.

In accordance with my present invention the source materials of a chosen phosphor, that is, materials from which the phosphor may be made, are caused to assume the state of a colloidal gel, which is converted by appropriate treatment to the state of a fluorescent powder. For example, in the fabrication of a siliceous fluorescent substance, a solution of a chosen metallic compound is mixed with a compound of silica, a suitable activator also being added. The mixture is converted to a gel, the ingredients being intimately mixed without the likelihood of becoming segregated when the gel is converted to a solid product. The composition finally is heat-treated until it assumes the desired fluorescent condition.

My invention will be more fully understood by a consideration of the following specific examples, the novel features of the invention being set forth in the appended claims.

In the preparation of a zinc silicate phosphor, a suitable compound containing silicon as a constituent, for example, an organic compound such as ethyl silicate or an inorganic compound such as potassium or sodium silicate or silicon tetrachloride, and a suitable zinc compound, for example, zinc nitrate or zinc oxide, are mixed in the proportions desired. If maximum phosphorescence is desired, the proportions of the ingredients should be equimolecular, in terms of one mol of zinc oxide and one mol of silica, the final product probably being an agglomerate of $Zn_2SiO_4$ and $SiO_2$. If phosphorescence is not desired in the product, the proportions may be chosen to yield two mols of zinc oxide and one mol of silica, and, indeed, other proportions may be used. If the chosen proportions are two mols of ZnO and one mol of $SiO_2$, then the zinc silicate $Zn_2SiO_4$ is formed. This product has only slight phosphorescence and has the same fluorescence as the equimolecular ratio.

The zinc nitrate, or other zinc compound, preferably is dissolved in ethyl alcohol, or other suitable solvent. I prefer to use an alcoholic solution containing about 25 per cent water. For example, for a preparation having the proportions of one mol of zinc oxide to one mol of silica and containing 0.4 per cent of manganese, a clear solution of ethyl silicate is prepared by adding, while stirring, 100 cc. of ethyl silicate to a mixture of 10.7 cc. water, 14.2 cc. ethyl alcohol, and 0.1 cc. concentrated hydrochloric acid. A solution of zinc nitrate is added, which may be prepared by dissolving 134 grams of hexahydrated zinc nitrate crystals in a mixture of 300 cc. ethyl alcohol and 90 cc. of water. A small amount of manganese nitrate solution or manganese carbonate (for example, the equivalent of 0.254 gm. manganese) is added to furnish the desired amount of the activator.

In place of ethyl silicate, I may use as the acid constituent of the phosphor silicates containing organic groups other than the ethyl group, for example, an alkyl silicate, such as the methyl, propyl, or amyl silicate; or I may use inorganic compounds, such as potassium silicate or silicon tetrachloride. In place of the zinc nitrate, as the base constituent, other soluble zinc salts may be used, such as the acetate or chloride or sulphate of zinc, or insoluble materials may be used, such as zinc oxide or zinc carbonate. Similarly, salts of other metals may be used to partly or wholly replace zinc, for example, magnesium, cadmium, or beryllium.

The quantity of manganese, or other suitable activator, is chosen to leave in general less than about 2 per cent and preferably about 0.4 per cent of metal constituent in the final product.

The liquid mixture is heated in the open to boiling, stirring sufficiently to avoid "bumping," resulting in the evaporation of enough volatile material to form a semisolid, colloidal siliceous gel, the formation of which is promoted by the presence of the hydrochloric acid. When the residue becomes a crumbly or easily friable solid, it is crushed and heated to a temperature of about 110° C., until it no longer cakes when the temperature may be slowly raised to 130 or 140° C., resulting in elimination of water and other volatile products, the nature of which depends on the character of the material employed. The product is reground, conveniently in a ball mill for a period of several hours and denitrated by reheating up to a final temperature of 350° C. After a short period of further grinding, the product finally is fired at a temperature of about 1000 to 1300° C. until the desired fluorescent properties are developed. Care should be exercised to avoid sintering or coarsening of particle size. Heating for 15 hours at about 1100° C. is satisfactory. Heretofore, when the ingredients were mixed as powders, a much longer firing period, ordinarily about three times as long, was required, with a corresponding greater coarsening.

When potassium silicate is used as the source of silica, the gel may be prepared by precipitating the silicate with hydrochloric acid. When silicon tetrachloride is used it is caused to react with water to form the gel.

The resulting phosphor is applied commonly as a thin coating on the interior surface of gaseous discharge lamps, such lamps so coated are described, for example, in Rüttenauer U. S. Patent 2,030,402 and Fritze U. S. Patent 2,030,440, both patented February 11, 1936. When the proportions are chosen as above indicated to produce phosphorescent as well as fluorescent properties, then the light output of a lamp provided with such phosphor is steadied.

When, as heretofore the practice, a mixture of chosen oxides (for example, zinc oxide and silica) is fired to develop fluorescence, the oxides become progressively coarser, requiring extended grinding to reduce the coarse product to sufficiently fine subdivision for use in fluorescent lamps. Such grinding is undesirable as it results in a serious reduction in the intensity of fluorescence. When the source constitutes for a phosphor are caused to assume the state of a gel, which is dried and heat-treated, then the product does not become coarsened so seriously and requires either no regrinding or very little regrinding with an accompanying improvement in effectiveness.

What I claim as new and desire to secure by Letters Patent of the United States is:

1. The method of preparing a fluorescent silicate which comprises forming a mixture of colloidal gel of silica formed from alkyl organic silicate, a metal compound which will react with said silica to form said fluorescent silicate, and an activator of fluorescent properties, heating to remove volatile constituents from the mixture, comminuting the product and firing at an elevated temperature to develop fluorescent properties.

2. The method of preparing a fluorescent silicate which comprises mixing an alkyl organic silicate, a metal compound which will react with silica gel derived from said silicate to form said fluorescent silicate, and manganese activator of fluorescence in chosen proportions in a liquid solvent therefor, heating to form a gel, heating further at a temperature sufficiently high to remove volatile constituents from the product, comminuting said product, and firing within a range of about 1000° to 1300° C. to produce fluorescent properties.

3. The method of preparing a fluorescent silicate which comprises forming a mixture of colloidal gel of silica formed from alkyl organic silicate, a water soluble salt of a metal which will react with said silica to form said fluorescent silicate, and a water soluble activator of fluorescent properties, heating to remove volatile constituents from the mixture, comminuting the product, heating at a higher temperature to drive off the acid constituent of said metal salt and firing at an elevated temperature to develop fluorescent properties.

4. The method of preparing a fluorescent silicate which comprises forming a mixture of colloidal gel of silica formed from alkyl organic silicate, a water soluble salt of a metal which will react with said silica to form said fluorescent silicate, a solvent for said metal salt, and a water soluble activator of fluorescent properties, heating to remove volatile constituents from the mixture, comminuting the product, heating at a higher temperature to drive off the acid constituent of said metal salt and firing at an elevated temperature to develop fluorescent properties.

5. The method of preparing a fluorescent silicate which comprises forming a mixture of colloidal gel of silicate formed from alkyl organic silicate, a water soluble salt of a metal which will react with said silicate to form said fluorescent silicate, a solvent for said metal salt, and a water soluble activator of fluorescent properties, heating to convert said mixture to a solid, comminuting said solid, heating further to remove volatile constituents, again comminuting the product, heating at a higher temperature to drive off the acid constituent of said metal salt and firing at an elevated temperature to develop fluorescent properties.

6. The method of preparing fluorescent zinc silicate which comprises mixing an alkyl organic silicate, a water soluble zinc salt and a water soluble manganese activator of fluorescence in chosen proportions in a liquid solvent therefor, heating to form a gel, heating further at a temperature sufficiently high to remove volatile constituents from the product, comminuting said product, heating at a higher temperature to drive off the acid constituent of said zinc salt and firing within a range of about 1000 to 1300° C. to produce fluorescent properties.

7. The method of preparing a fluorescent silicate which comprises heating in admixture with one another an alkyl organic silicate, a water soluble salt of a metal which will react with silica gel derived from said silicate to form said fluorescent silicate, a water soluble manganese activator of fluorescence and a liquid solvent therefor to form a gel, heating further to remove volatile constituents and to form a solid product, comminuting the product, heating at a higher temperature to drive off the acid constituent of said metal salt and ultimately firing the resulting product to a temperature within the range of about 1000 to 1300° C. to develop fluorescent properties.

8. The method of preparing fluorescent zinc silicate which comprises mixing an aqueous ethyl alcohol, a silicate of an alkyl base, a soluble zinc compound and a soluble manganese activator of fluorescence, heating to remove volatile material until a gel is formed, heating further to convert said gel to the solid state, comminuting said solid, heating to a temperature of about 130 to 140° C., thereby further eliminating volatile material, recomminuting the product, reheating to about 350° C., again recomminuting and finally firing to a temperature within the range of about 1000 to 1300° C.

9. In the process of forming a zinc silicate phosphor the steps which comprise producing a mixture consisting of ethyl silicate and zinc nitrate in equimolecular proportions together with a relatively small proportion of a manganese nitrate and a liquid solvent for said ingredients and a suitable acid which promotes the formation of a gel, heating to cause said mixture to assume the state of a gel, heating further to convert said gel to a crumbly solid product, comminuting and reheating said product successively, the temperature of reheating being successively increased to about 350° C. and finally firing at a temperature of about 1000 to 1300° C. until desired fluorescent properties are developed.

GORTON R. FONDA.